United States Patent
Hashiwaki

(10) Patent No.: US 10,714,729 B2
(45) Date of Patent: Jul. 14, 2020

(54) CORE AND SEPARATOR ROLL

(71) Applicant: Sumitomo Chemical Company, Limited, Tokyo (JP)

(72) Inventor: Hiroki Hashiwaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 121 days.

(21) Appl. No.: 15/688,506

(22) Filed: Aug. 28, 2017

(65) Prior Publication Data
US 2018/0062144 A1 Mar. 1, 2018

(30) Foreign Application Priority Data

Aug. 29, 2016 (JP) .................................. 2016-167094
Mar. 31, 2017 (KR) ........................ 10-2017-0041680

(51) Int. Cl.
| | | |
|---|---|---|
| H01M 2/18 | (2006.01) |
| B65H 75/10 | (2006.01) |
| B65H 75/28 | (2006.01) |
| B65H 75/26 | (2006.01) |
| H01M 10/04 | (2006.01) |
| H01M 2/02 | (2006.01) |
| H01M 2/14 | (2006.01) |

(52) U.S. Cl.
CPC .............. *H01M 2/18* (2013.01); *B65H 75/10* (2013.01); *B65H 75/265* (2013.01); *B65H 75/28* (2013.01); *B65H 2701/5122* (2013.01); *H01M 2/029* (2013.01); *H01M 2/14* (2013.01); *H01M 10/0431* (2013.01)

(58) Field of Classification Search
CPC ....... B65H 75/265; B65H 2701/18442; H01M 10/0431; H01M 10/0409
See application file for complete search history.

(56) References Cited

U.S. PATENT DOCUMENTS

| | | | |
|---|---|---|---|
| 6,020,084 A | 2/2000 | Romero et al. | |
| 2011/0217576 A1* | 9/2011 | Ueda ....................... | H01M 2/26 429/94 |
| 2014/0186686 A1* | 7/2014 | Takahashi ............... | H01M 2/38 429/163 |
| 2014/0322585 A1 | 10/2014 | Iizuka et al. | |

FOREIGN PATENT DOCUMENTS

| | | |
|---|---|---|
| JP | S52-55935 A | 5/1977 |
| JP | H0839688 A | 2/1996 |
| JP | H11-339838 A | 12/1999 |
| JP | 2001226041 A | 8/2001 |
| JP | 2006-151691 A | 6/2006 |
| JP | 2006-168875 A | 6/2006 |
| JP | 2007197179 A | 8/2007 |
| JP | 200962161 A | 3/2009 |
| JP | 2013-139340 A | 7/2013 |

OTHER PUBLICATIONS

Office Action dated Nov. 13, 2017 in KR Application No. 10-2017-0085708.
Office Action dated Sep. 25, 2018 in JP Application No. 2017152351 (Partial Translation).
Office Action dated Jan. 22, 2019 in JP Application No. 2017-152351 (Partial English Translation).

* cited by examiner

*Primary Examiner* — Ladan Mohaddes
(74) *Attorney, Agent, or Firm* — Panitch Schwarze Belisario & Nadel LLP

(57) ABSTRACT

A core prevents or reduces misalignment of a battery separator wound around the core. The core has one or more grooves in the outer peripheral surface thereof. The grooves extend substantially in the width direction of the core. The grooves have a depth of 30 μm or greater, and the following condition (1) is satisfied:

$$N/D > 0.0025 \qquad (1)$$

where D is the outer circumference in mm of the core and N is the number of the grooves in the outer peripheral surface.

11 Claims, 10 Drawing Sheets

FIG. 11

| | Peripheral length of core | First groove | | Second groove | | Third groove | | | Number of grooves | Misalignment | Number of grooves/ Peripheral length of core |
|---|---|---|---|---|---|---|---|---|---|---|---|
| | | Depth of groove | Dimension of groove in direction of width of core/Core | Depth of groove | Dimension of groove in direction of width of core/Core | Depth of groove | Dimension of groove in direction of width of core/Core | | | | |
| Unit | mm | μm | | μm | | μm | | | | mm | Grooves/mm |
| First experimental example Ex1 | 479 | 216 | 1 | 231 | 1 | 342 | 1 | | 3 | 0.20 | 0.0063 |
| Second experimental example Ex2 | 479 | 182 | 1 | 187 | 1 | — | — | | 2 | 0.50 | 0.0042 |
| Third experimental example Ex3 | 479 | 118 | 1 | 522 | 1 | — | — | | 2 | 0.30 | 0.0042 |
| Fourth experimental example Ex4 | 479 | 434 | 1 | 881 | 0.6 | — | — | | 2 | 0.40 | 0.0042 |
| Fifth experimental example Ex5 | 479 | — | 0 | — | — | — | — | | 0 | 1.70 | 0.0000 |
| Sixth experimental example Ex6 | 479 | 325 | 1 | — | — | — | — | | 1 | 1.40 | 0.0021 |
| Seventh experimental example Ex7 | 290 | 234 | 1 | — | — | — | — | | 1 | 0.55 | 0.0035 |
| Eighth experimental example Ex8 | 290 | 196 | 1 | 475 | 1 | — | — | | 2 | 0.35 | 0.0069 |
| Ninth experimental example Ex9 | 479 | 26 | 1 | 28 | 1 | — | — | | 2 | 1.8 | 0.0042 |

CORE AND SEPARATOR ROLL

This nonprovisional application claims priority under 35 U.S.C. § 119 on Patent Application No. 2016-167094 filed in Japan on Aug. 29, 2016 and Patent Application No. 10-2017-0041680 filed in Korea on Mar. 31, 2017, the entire contents of which are hereby incorporated by reference.

TECHNICAL FIELD

The present invention relates to (i) a core around which a battery separator is to be wound and (ii) a separator roll.

BACKGROUND ART

Inside a lithium-ion secondary battery, a cathode and anode are separated by a porous separator. The production of lithium-ion batteries utilizes a separator roll which includes the porous separator and a cylindrical core around which the separator is wound.

Patent Literature 1 discloses (i) a core that includes an electrically conductive component and (ii) a roll composed of a microporous film wound around such a core.

CITATION LIST

Patent Literature

[Patent Literature 1]
Japanese Patent Application Publication, Tokukai No. 2013-139340 (Publication date: Jul. 18, 2013)

SUMMARY OF INVENTION

Technical Problem

Generally, a battery separator is transferred in the form of a separator roll, which is obtained by winding the separator around a core, and then is subjected to the battery production process. In the battery production process, the battery separator is unwound from the core to be used. For battery assembly equipment to run stably, the battery separator has to be wound without misalignment of wound layers.

However, in the case where a conventional core is used, the first several layers of the battery separator cannot be wound stably, which may result in misalignment in which the first layer protrudes over the edges of stably wound layers (layers outside the first several layers).

In the event the first several layers protrude in this manner, the battery separator needs to be unwound from the separator roll and wound again. This has been a cause of reduction in production efficiency.

The present invention was made in view of the above problem, and an object of one aspect of the present invention is to prevent or reduce misalignment of wound layers of the battery separator.

Solution to Problem

In order to attain the above object, a core according to one aspect of the present invention is a core for allowing a battery separator to be wound around an outer peripheral surface thereof, including one or more grooves in the outer peripheral surface, the one or more grooves extending in a direction intersecting a direction in which the battery separator is wound, the one or more grooves having a depth of 30 μm or greater, and the following condition (1) being satisfied:

$$N/D > 0.0025 \tag{1}$$

where D is the outer circumference in mm of the core and N is the number of the one or more grooves in the outer peripheral surface.

Advantageous Effects of Invention

One aspect of the present invention yields the effect of preventing or reducing misalignment of wound layers of a battery separator wound around a core.

BRIEF DESCRIPTION OF DRAWINGS

FIG. 11 is a table showing the measurement results on experimental examples in accordance with examples of the present invention.

DESCRIPTION OF EMBODIMENTS

[Embodiment 1]
(Lithium-ion Secondary Battery)

A nonaqueous electrolyte secondary battery, a lithium-ion secondary battery being a representative example thereof, has a high energy density. Due to this fact, nonaqueous electrolyte secondary batteries are currently widely used in such devices as personal computers, mobile phones, and mobile information terminals, as well as in motorized objects such as automobiles and aircraft. Nonaqueous electrolyte secondary batteries are also widely used as stationary batteries to contribute to a stable supply of power.

Figure 1:
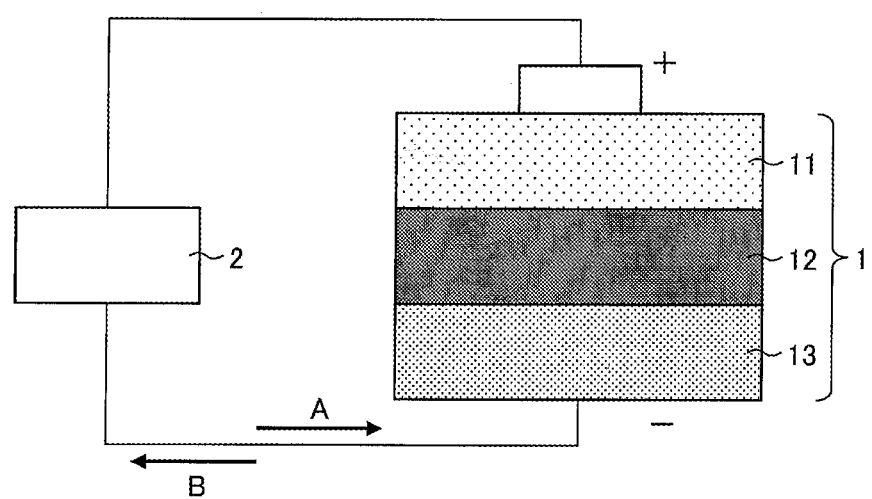
FIG. 1 is a schematic view illustrating a cross sectional configuration of a lithium-ion secondary battery.

FIG. 1 is a schematic view illustrating a cross sectional configuration of a lithium-ion secondary battery 1 (battery).

As illustrated in FIG. 1, the lithium-ion secondary battery 1 includes a cathode 11, a separator 12 (battery separator), and an anode 13. Outside the lithium-ion secondary battery 1, an external device 2 is connected to the cathode 11 and the anode 13. While the lithium-ion secondary battery 1 is being charged, electrons move in direction A. On the other hand, while the lithium-ion secondary battery 1 is being discharged, electrons move in direction B.

(Separator)

The separator 12 is arranged such that it is sandwiched between the cathode 11, which is a positive electrode of the lithium-ion secondary battery 1, and the anode 13, which is a negative electrode of the lithium-ion secondary battery 1. The separator 12 is a porous film that separates the cathode 11 and the anode 13 while allowing lithium ions to move therebetween. The separator 12 contains, for example, polyolefin such as polyethylene or polypropylene as a component material.

Figure 2A:
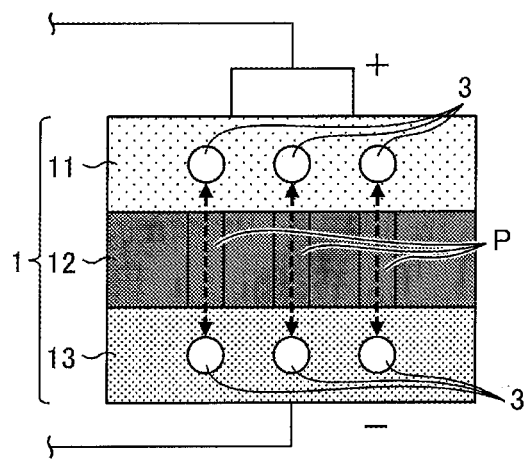
FIGS. 2A, 2B, and 2C are schematic views illustrating details of the configuration of the lithium-ion secondary battery illustrated in FIG. 1.
Figure 2B:
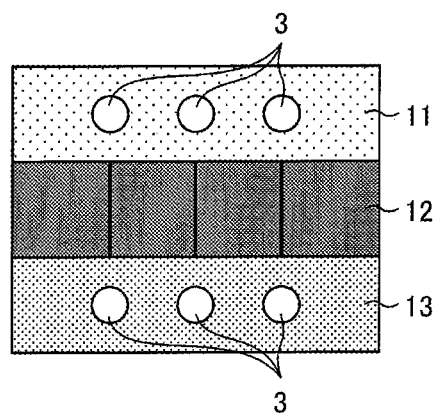
Figure 2C:
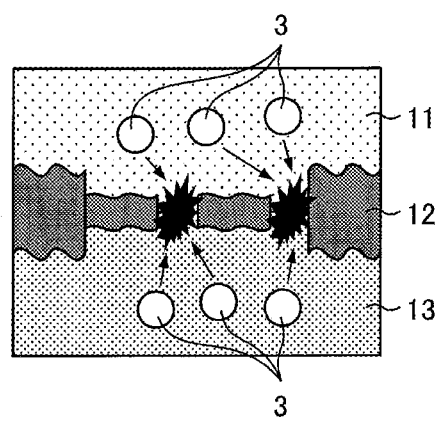

FIGS. 2A-2C are schematic views illustrating details of the configuration of the lithium-ion secondary battery 1 illustrated in FIG. 1. FIG. 2A illustrates a configuration of the lithium-ion secondary battery 1 in a normal state. FIG. 2B illustrates a state in which the temperature of the lithium-ion secondary battery 1 has risen. FIG. 2C illustrates a state in which the temperature of the lithium-ion secondary battery 1 has risen sharply.

As illustrated in FIG. 2A, the separator 12 is provided with many pores P. Normally, lithium ions 3 in the lithium-ion secondary battery 1 can move back and forth through the pores P.

Note, here, that there are cases in which the temperature of the lithium-ion secondary battery 1 rises due to, for example, excessive charging of the lithium-ion secondary battery 1, a high current caused by short-circuiting of the external device, or other such causes. In such cases, the separator 12 melts or softens, and the pores P are blocked, as illustrated in FIG. 2B. As a result, the separator 12 shrinks. This stops the abovementioned movement of the lithium ions 3, and consequently stops the abovementioned temperature rise.

However, in a case where the temperature of the lithium-ion secondary battery 1 rises sharply, the separator 12 shrinks suddenly. In such a case, as illustrated in FIG. 2C, the separator 12 may be destroyed. The lithium ions 3 would then leak out from the destroyed separator 12. As a result, the lithium ions 3 do not stop moving. Consequently, the temperature of the battery continues rising.

(Heat-resistant Separator)

Figure 3A:
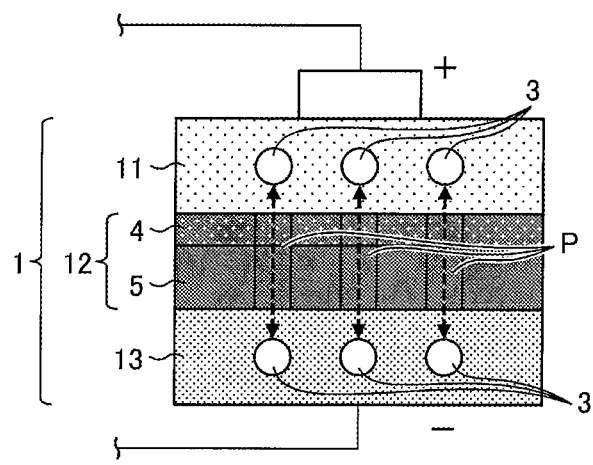
FIGS. 3A and 3B are schematic views illustrating another configuration of the lithium-ion secondary battery illustrated in FIG. 1.
Figure 3B:
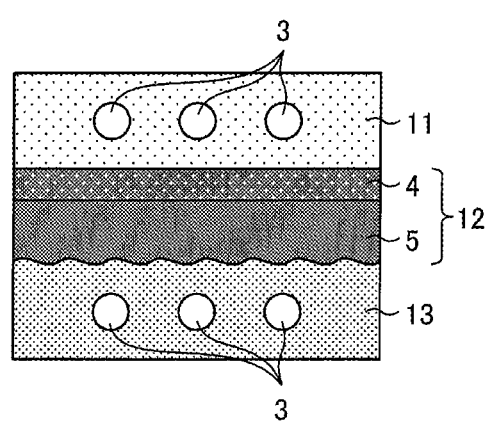

FIGS. 3A and 3B are schematic views illustrating another configuration of the lithium-ion secondary battery 1 illustrated in FIG. 1. FIG. 3A illustrates a configuration of the lithium-ion secondary battery 1 in a normal state, and FIG. 3B illustrates a state in which the temperature of the lithium-ion secondary battery 1 has risen sharply.

As illustrated in FIG. 3A, the separator 12 may be a heat-resistant separator that includes a porous film 5 and a heat-resistant layer 4. The heat-resistant layer 4 is layered upon one surface of the porous film 5, the one surface being on the cathode 11 side. Note that the heat-resistant layer 4 can alternatively be layered upon one surface of the porous film 5, the one surface being on the anode 13 side, or upon both surfaces of the porous film 5. The heat-resistant layer 4 is provided with pores which are similar to the pores P of the separator 12. Normally, the lithium ions 3 move back and forth through the pores P of the separator 12 and the pores of the heat-resistant layer 4. The heat-resistant layer 4 contains, for example, wholly aromatic polyamide (aramid resin) as a component material.

As illustrated in FIG. 3B, even in a case where the temperature of the lithium-ion secondary battery 1 sharply rises and, the porous film 5 melts or softens as a result, the shape of the porous film 5 is maintained because the heat-resistant layer 4 supports the porous film 5. Therefore, such a sharp temperature rise would result in only melting or softening of the porous film 5 and consequent blocking of the pores P. This stops movement of the lithium ions 3 and consequently stops the above-described excessive discharging or excessive charging. In this way, destruction of the separator 12 can be prevented.

(Steps of Production Of Heat-resistant Separator)

A method of producing the heat-resistant separator of the lithium-ion secondary battery 1 is not particularly limited. The heat-resistant separator can be produced using a publicly known method. The following discussion assumes a case where the porous film 5 contains polyethylene as a main component material. However, even in a case where the porous film 5 contains some other material, similar steps can still be used to produce the separator 12.

For example, it is possible to employ a method including (i) a step of forming a film by adding a plasticizer to a thermoplastic resin, and (ii) a subsequent step of removing the plasticizer with an appropriate solvent. For example, in a case where the porous film 5 is made of a polyethylene resin containing ultra-high molecular weight polyethylene, it is possible to produce the porous film 5 via the following method.

This method includes (1) a kneading step in which a polyethylene resin composition is obtained by kneading an ultra-high molecular weight polyethylene and an inorganic filler such as calcium carbonate, (2) a rolling step in which a film is formed with the polyethylene resin composition, (3) a removal step in which the inorganic filler is removed from the film obtained in the step (2) above, and (4) a stretching step in which the porous film 5 is obtained by stretching the film obtained in the step (3) above.

Through the removal step, many fine pores are created in the film. The fine pores of the film stretched in the stretching step become the above-described pores P. The porous film 5 formed as a result is a polyethylene microporous film having a prescribed thickness and a prescribed air permeability.

Note that in the kneading step, 100 parts by weight of the ultra-high molecular weight polyethylene, 5 parts by weight to 200 parts by weight of a low molecular weight polyolefin having a weight-average molecular weight of 10,000 or less, and 100 parts by weight to 400 parts by weight of the inorganic filler may be kneaded.

Thereafter, in a coating step, the heat-resistant layer 4 is formed on a surface of the porous film 5. For example, on the porous film 5, an aramid/NMP (N-methylpyrrolidone) solution (coating solution) is applied, and thereby, the heat-resistant layer 4 that is an aramid heat-resistant layer is formed. The heat-resistant layer 4 may be provided on only one surface or on both surfaces of the porous film 5. The heat-resistant layer 4 may alternatively be formed with a coating using a mixed solution containing a filler such as alumina/carboxymethyl cellulose.

The method for coating the porous film 5 with a coating solution is not particularly limited as long as it is a method that enables uniform wet coating. The method may be a conventional and publicly known method such as a capillary coating method, a spin coating method, a slit die coating method, a spray coating method, a dip coating method, a roll coating method, a screen printing method, a flexo printing method, a bar coater method, a gravure coater method, or a die coater method. The thickness of the heat-resistant layer 4 can be controlled by adjusting (i) the thickness of a coating wet film and (ii) the concentration of solid content in the coating solution.

Note that it is possible to use a resin film, a metal belt, a drum or the like as a support by which the porous film 5 is fixed or conveyed during coating.

As described above, it is possible to produce a separator 12 (heat-resistant separator) in which a heat-resistant layer 4 is layered upon a porous film 5. The separator thus produced is wound around a cylindrical core. Note that the object to be produced via the above production method is not limited to being a heat-resistant separator. The above production method does not necessarily include the coating step. In a case where the production method includes no coating step, the object to be produced is a separator including no heat-resistant layer. Additionally, an adhesion separator including some other functional layer (for example, an adhesion layer as described later) instead of the heat-resistant layer may be produced via the same production method as the heat-resistant separator.

(Slitting Apparatus)

The heat-resistant separator and the separator including no heat-resistant layer (both types of separator hereinafter referred to as "separator") preferably have a width (hereinafter, "product width") suitable for products in which the separator will be utilized, such as the lithium-ion secondary battery 1. However, in order to improve productivity, the separator is produced so as to have a width that is equal to or larger than the abovementioned product width. Then, after having been thus produced, the separator is slit into a separator(s) of a width equal to the product width.

Note that "width of a separator" means a dimension of the separator in a direction substantially perpendicular to both the length direction and the thickness direction of the separator. In the description below, a wide separator having not yet been slit is referred to as an "original sheet," while a separator having been slit is specifically referred to as a "slit separator". Note also that here, the term "slit" means to slit the separator in the length direction (the direction of the flow of the film during production; MD: Machine Direction), and that the term "cut" means to cut the separator in a transverse direction (TD). The transverse direction (TD) means a direction which is substantially perpendicular to the length direction (MD) and the thickness direction of the separator.

Figure 4A:
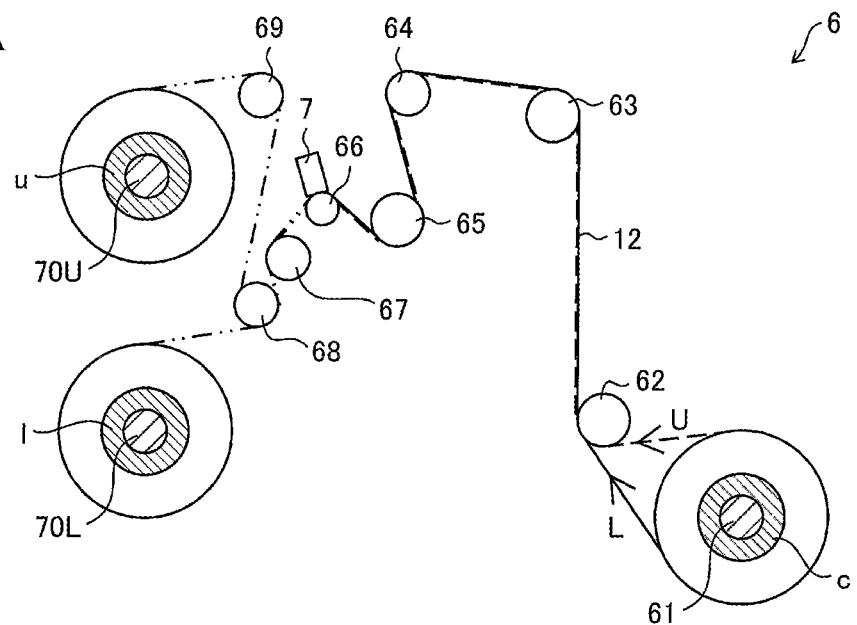
FIGS. 4A and 4B are schematic views illustrating a configuration of a slitting apparatus for slitting a separator.
Figure 4B:
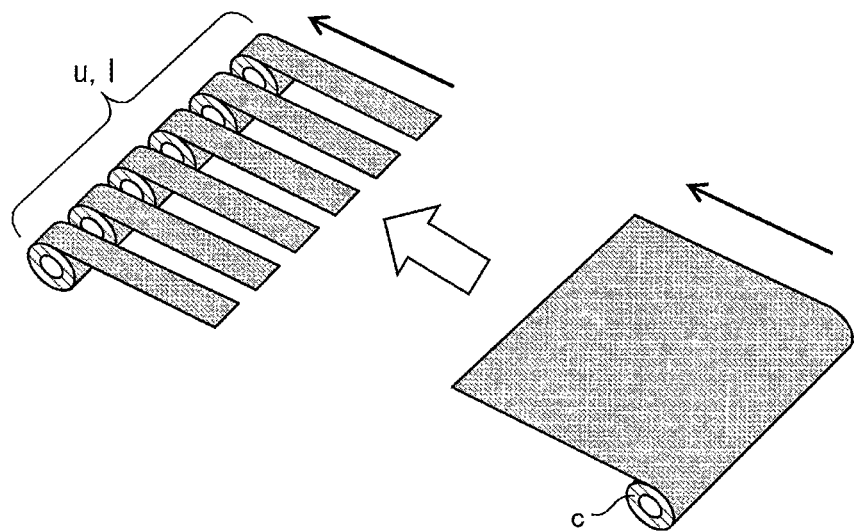

FIGS. 4A and 4B are schematic views illustrating a configuration of a slitting apparatus 6 for slitting a separator. FIG. 4A illustrates an overall view of a configuration of a slitting apparatus, and FIG. 4B illustrates configurations before and after slitting the original sheet.

As illustrated in FIG. 4A, the slitting apparatus 6 includes a cylindrical wind-off roller 61 that is supported such that it can rotate, rollers 62 to 69, and take-up rollers 70U and 70L. The slitting apparatus 6 is further provided with a cutting device 7 described later.

(Before Slitting)

In the slitting apparatus 6, a cylindrical core c around which the original sheet is wound is fit on the wind-off roller 61. As illustrated in FIG. 4B, the original sheet is wound off from the core c to route U or route L. The original sheet thus wound off is conveyed to the roller 68 via the rollers 63 to 67. During the step of conveying the unwound original sheet, the original sheet is slit into a plurality of slit separators.

(After Slitting)

As illustrated in FIG. 4B, some of the slit separators are each wound around cylindrical cores u (bobbins) fit on the take-up roller 70U. Meanwhile, the other slit separators are each wound around cylindrical cores l (bobbins) fit on the take-up roller 70L. Note that each of the separators wound into a roll form is referred to as a "separator roll."

(Cutting Device)

Figure 5A:
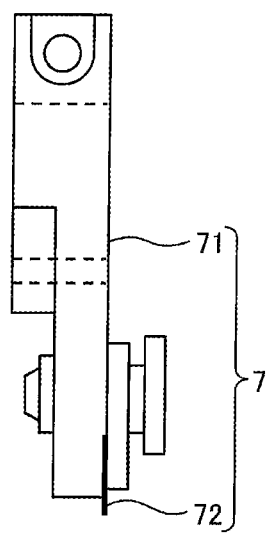
FIGS. 5A and 5B are a combination of a side view and a front view illustrating a configuration of a cutting device of the slitting apparatus illustrated in FIGS. 4A and 4B.
Figure 5B:
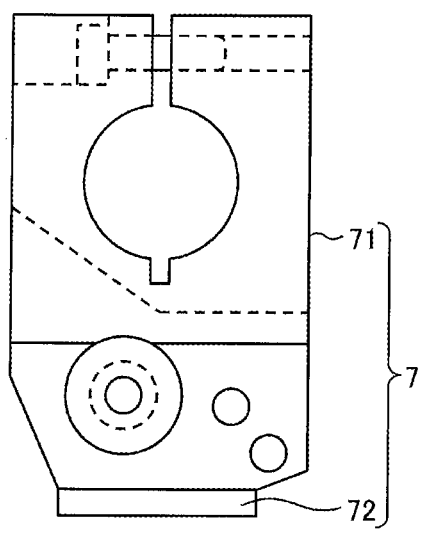

FIGS. 5A and 5B illustrate a configuration of the cutting device 7 of the slitting apparatus 6 illustrated in FIG. 4A. FIG. 5A is a side view of the cutting device 7, and FIG. 5B is a front view of the cutting device 7.

As illustrated in FIGS. 5A and 5B, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 (i) has a finely sharpened edge and (ii) slits the original sheet of the separator by using the edge.

(Configuration of Separator Roll)

Figure 6A:
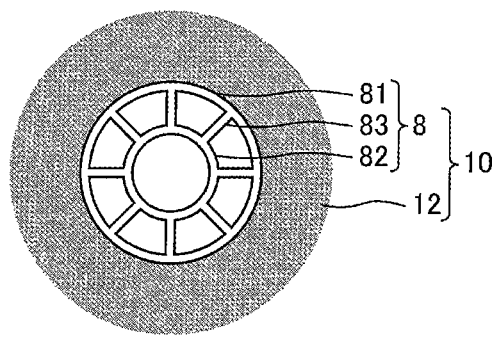
FIGS. 6A, 6B, 6C, and 6D are schematic views illustrating a configuration of a separator roll in accordance with Embodiment 1 of the present invention.
Figure 6B:
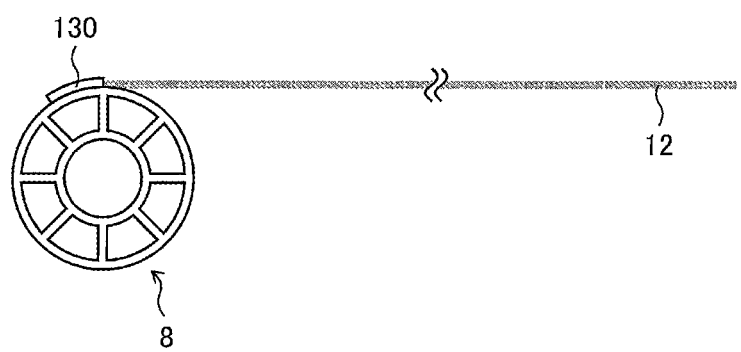
Figure 6C:
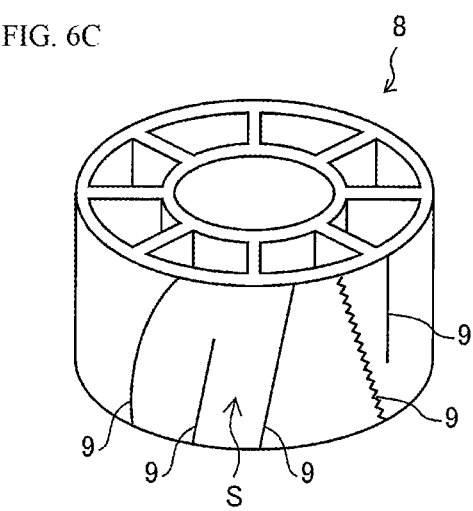
Figure 6D:
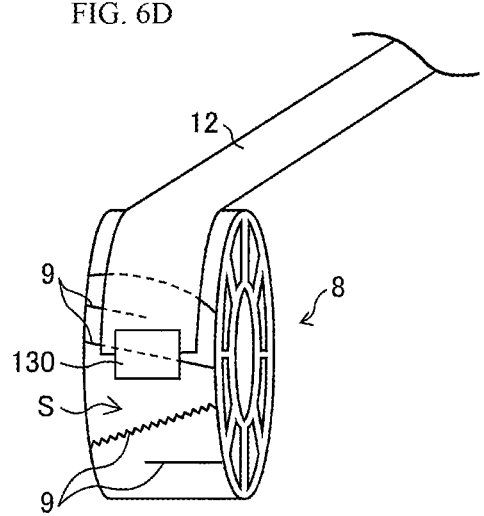

FIGS. 6A, 6B, 6C, and 6D are schematic views illustrating a configuration of a separator roll 10 according to Embodiment 1 of the present invention. FIG. 6A shows a separator 12 in a state before being wound off a core 8. FIG. 6B shows the separator 12 in a state in which it has been wound off from the core 8. FIG. 6C shows the core 8 in a state after the separator 12 has been wound off and removed. FIG. 6D shows the illustration of FIG. 6B from a different angle.

As is shown in FIG. 6A, the separator roll 10 includes a core 8 with a separator 12 wound thereon. The separator 12 is one of the slit separators into which the original sheet of the separator has been slit as described above.

The core 8 includes an outer cylindrical part 81, an inner cylindrical part 82, and ribs 83. The core 8 has the same function as the cores u and l mentioned above.

The outer cylindrical part 81 is a cylindrical member for winding a separator 12 around the outer peripheral surface of the outer cylindrical part 81. The inner cylindrical part 82 is a cylindrical member for fitting a take-up roller to the inner peripheral surface of the inner cylindrical part 82. The ribs 83 are support members that support the outer cylindrical part 81 from the inner peripheral surface thereof, the ribs 83 extending between the inner peripheral surface of the outer cylindrical part 81 and the outer peripheral surface of the inner cylindrical part 82.

A material for the core 8 includes ABS resin. However, the material for the core 8 according to Embodiment 1 of the present invention is not limited to the above. The material for the core may include resins other than ABS resin, such as polyethylene resin, polypropylene resin, polystyrene resin, and vinyl chloride resin. It is preferable that metal, paper, and/or fluorocarbon resin are not used as the material for the core.

As illustrated in FIGS. 6C and 6D, the outer peripheral surface S of the core 8 (that is, the outer peripheral surface of the outer cylindrical part 81) has one or more grooves 9 extending substantially in the width direction (TD) of the core 8. The grooves 9 will be described later in detail.

As illustrated in FIGS. 6B and 6D, one end of the separator 12 is affixed to the core 8 via adhesive tape 130. Specifically, the abovementioned one end of the separator 12 is fixed to the outer peripheral surface S of the core 8 via adhesive tape 130, the adhesive tape 130 including an adhesive agent. The one end of the separator may be fixed to the outer peripheral surface S by means of directly applying an adhesive to the abovementioned one end of the separator 12, by using a clip, or in some other way other than using the adhesive tape 130. Unevenness of the outer peripheral surface of the core 8, except for fine structures on the outer peripheral surface S of the core 8, is transferred to the separator 12.

Figure 7:
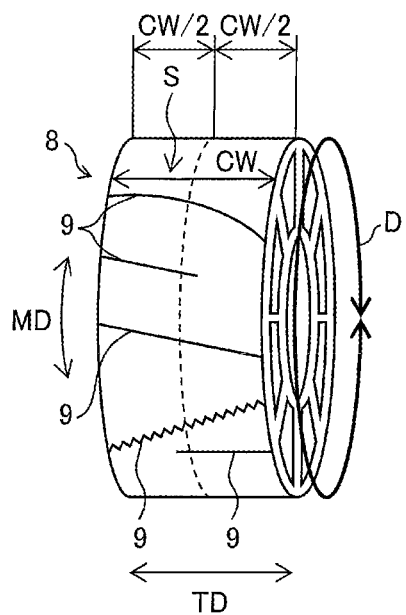
FIG. 7 is a perspective view of a core in accordance with Embodiment 1 of the present invention.

FIG. 7 is a perspective view of the core 8 in accordance with Embodiment 1 of the present invention.

As illustrated in FIG. 7, the outer peripheral surface S of the core 8 has one or more grooves 9 extending in substantially parallel to the TD of the core 8, that is, substantially perpendicular to the MD of the core 8. This makes it possible, when the separator 12 is wound on the outer peripheral surface S of the core 8, to allow the air trapped between the outer peripheral surface S of the core 8 and the separator 12 to escape along the grooves 9.

The grooves 9 may be formed in the outer peripheral surface S of the core 8, on which the separator 12 is not wound, with the use of, for example, a cutter. The separator 12 is wound on the outer peripheral surface S of the core 8, which has the grooves 9, to obtain a separator roll 10.

At first, the separator 12 is wound around the core with a touch roll pressed thereon. If the core in this situation has no grooves 9 in the outer peripheral surface thereof, air is trapped between the core and the separator 12 and this may cause slight misalignment of wound layers of the separator 12.

It is apparent that especially the first several layers of the wound separator 12 are significantly affected by the trapped air and are wound unstably and thus are misaligned.

In contrast, the core 8 has the grooves 9 in the outer peripheral surface S thereof. Each groove 9 has a depth of 30 μm or greater and, assuming that the number of grooves 9 is N and the outer circumference of the core 8 (such a circumference may be referred to as the peripheral length of the core) is D (mm), the outer peripheral surface S of the core 8 has the grooves 9 in a manner such that the following condition (1) is satisfied.

$$N/D > 0.0025 \tag{1}$$

When this condition is satisfied, it is possible to allow the air trapped between the outer peripheral surface S and the separator 12 to escape to outside sufficiently along the grooves 9. Especially when the grooves 9 are formed in the outer peripheral surface S of the core 8 so as to allow the air trapped between the first wound layer of the separator 12 and the core 8 to escape sufficiently in the initial stage of winding, it is possible to prevent the occurrence of misalignment of initially wound layers and thus possible to reduce the rate of occurrence of defectives caused by the misalignment.

As described above, the inventor of the present invention found from the results of experiments (described later) that, when the core 8 has the prescribed grooves 9 extending in the direction (TD) intersecting the direction (MD) in which the separator 12 is wound, misalignment is reduced during the winding of the separator 12.

When the outer peripheral surface S of the core 8 has the grooves 9 which are 30 μm or greater in depth and N/D>0.0025 (grooves/mm) is satisfied as described above, it is possible to produce a separator roll 10 in which the difference between an edge of the first wound layer portion of the separator 12 wound around the core 8 and an edge of a portion of the separator 12 obtained by winding the separator 12 on the core 8 until a thickness of 10 mm is reached is 1.5 mm or less. That is, the use of the core 8 in accordance with Embodiment 1 of the present invention makes it possible to obtain a separator roll 10 with no or little misalignment and thus possible to improve production efficiency.

It should be noted that in the case where the depth of the groove is less than 30 μm or N/D≤0.0025, it is not possible to sufficiently prevent or reduce the misalignment. This will be described later in detail on the basis of the results of experiments.

The length of the groove 9 in the core 8 is preferably CW/2 or greater, where CW is the width of the core 8 (a dimension of the core in TD). Furthermore, the groove 9 preferably extends over a region of CW/2 or greater with respect to the width CW of the core 8. This makes it possible to allow the air trapped between the outer peripheral surface S of the core 8 and the separator 12 to escape efficiently.

The groove 9 in the core 8 may be in the form of a straight line, a curved line, or a serpentine shape. The groove 9 is preferably in the shape of a straight line.

In the case where the groove 9 is in the shape of a straight line, the acute angle between the groove 9 and a straight line parallel to TD of the core 8 is preferably 25 degrees or less, more preferably 15 degrees or less. In the case where the groove 9 is in the shape of a curved line or a serpentine shape, the acute angle between a line segment connecting the start and end points of the groove in the shape of a curved line or a serpentine shape and a straight line parallel to TD of the core 8 is preferably 15 degrees or less. This makes it possible to allow the air trapped between the outer peripheral surface S of the core 8 and the separator 12 to escape efficiently when the separator 12 is wound on the outer peripheral surface S of the core 8.

For the trapped air to escape efficiently, the groove 9 preferably has at least one end thereof at an edge of the core 8. It is more preferable that the groove 9 have both ends thereof at opposite edges of the core 8. This makes it possible to allow the air trapped between the outer peripheral surface S of the core 8 and the separator 12 to escape more efficiently. It should be noted that the groove 9 may have such a length that the other end of the groove 9 is short of an edge of the core 8.

There is no particular upper limit on the number of grooves 9 in the outer peripheral surface S of the core 8. However, if the core 8 has many grooves 9, the core 8 may become weak and, when the separator 12 is wound around the core 8 with tension, the core 8 may deform or may be broken. Therefore, the N/D is preferably less than 0.1. This makes it possible to maintain the strength of the core 8 and thus possible to prevent the breakage of the core 8 when the separator 12 is wound.

Figure 8:
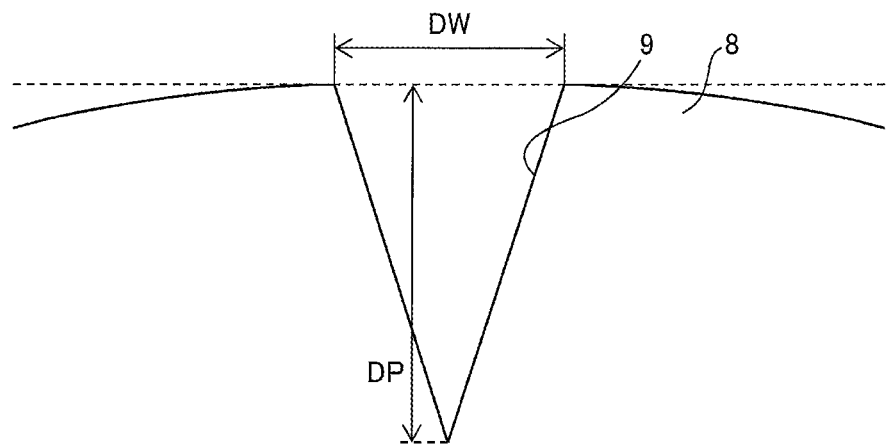
FIG. 8 is a cross-sectional view of a groove in the core in accordance with Embodiment 1 of the present invention.

FIG. 8 is a cross-sectional view of a groove 9 in the core 8. FIG. 8 illustrates a cross section of the groove 9 taken along MD shown in FIG. 7.

The shape of a cross section of the groove 9 is preferably a triangle (letter V shape). This is because such a groove is easily formed and, in view of recycling the core 8, the groove 9 is resistant to dust and is readily cleaned. It should be noted that the shape of a cross section of the groove 9 is not limited to a triangle. For example, the shape may be a shape other than a triangle such as a square (sharp cornered U shape) or a semicircle.

Assuming that the dimension of the groove 9 in a direction perpendicular to the direction in which the groove 9 in the core 8 extends is the width DW, the width DW of the groove 9 is preferably 10 μm or greater, more preferably 50 μm or greater. This makes it possible to allow air to escape along the groove 9 more efficiently.

On the other hand, if the width DW of the groove 9 is large, the shape of the groove 9 is transferred to the separator 12. Therefore, the width DW of the groove 9 is preferably 500 μm or less. This makes it possible to prevent the occurrence of defectives caused by the transfer of the groove 9 to the separator 12 wound around the core 8.

Assuming that the distance from a plane in contact with both sides of the groove 9 to the bottom of the groove 9 is the depth DP of the groove 9, the depth DP of the groove 9 may or may not be uniform throughout the groove 9.

It should be noted, however, that the depth DP of the groove 9 has to be 30 μm or greater as described earlier. The depth DP of the groove 9 is more preferably 50 μm or greater. This makes it possible to allow air to escape more efficiently along the groove 9.

On the other hand, in view of cleaning the core 8 for recycling, the depth DP of the groove 9 even at the deepest point thereof is preferably about 1000 μm. This makes it easy to remove foreign substances, if any, in the groove 9 and thus possible to readily recycle the core 8.

In the case where two or more grooves are formed, two grooves may intersect each other. This makes it possible to allow the air trapped between the outer peripheral surface S of the core 8 and the separator 12 to escape more efficiently when the separator 12 is wound on the outer peripheral surface S of the core 8.

EXAMPLES

The following describes examples of the present invention with reference to FIGS. 9 to 12.

Figure 9:
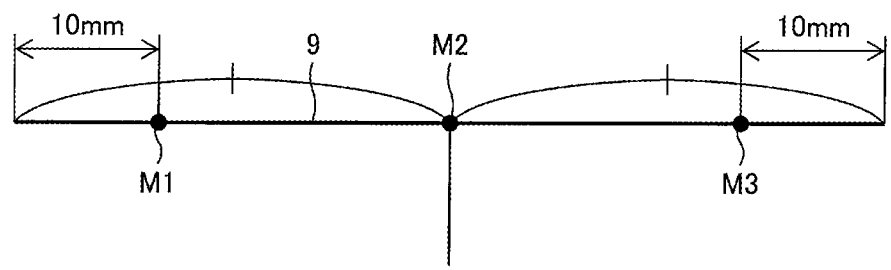
FIG. 9 illustrates the measuring positions of a groove in accordance with an example of the present invention.
Figure 10:
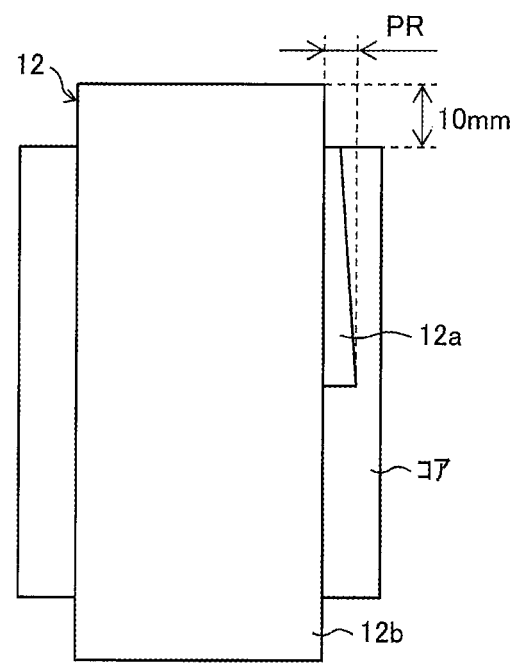
FIG. 10 illustrates how misalignment of wound layers occurs in a separator roll in accordance with an example of the present invention.
Figure 12:
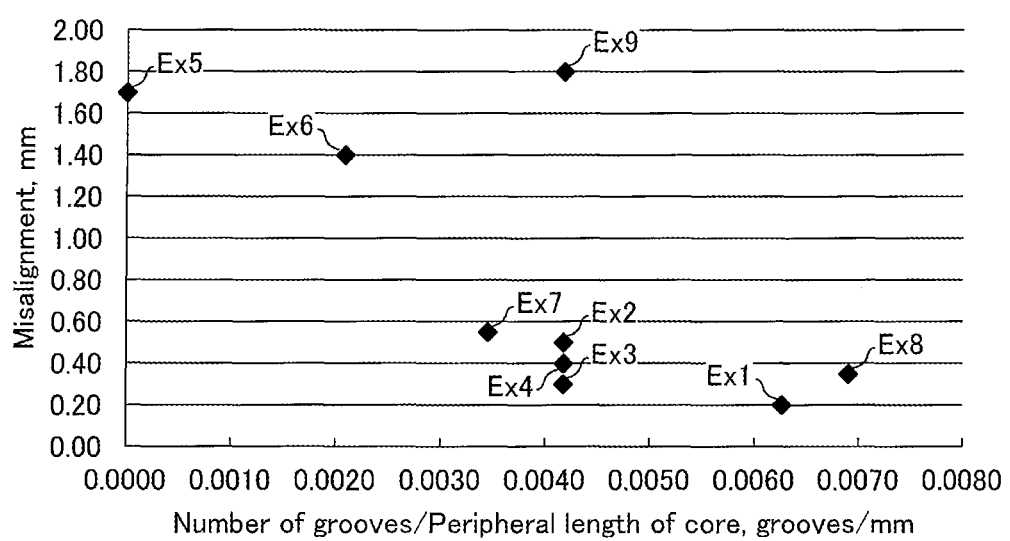
FIG. 12 shows the experimental examples in FIG. 11 plotted on a graph.

FIG. 9 illustrates the measuring positions of a groove in accordance with an example of the present invention. FIG. 10 illustrates how misalignment of wound layers occurs in a separator roll in accordance with an example of the present invention. FIG. 11 is a table showing the measurement results on experimental examples in accordance with examples of the present invention. FIG. 12 shows the experimental examples in FIG. 11 plotted on a graph.

A separator obtained by coating a polyethylene porous film with a heat-resistant layer made of an aramid resin was slit into a width of 60 mm and the slit separator was wound around nine cores (65 mm in width) having various grooves, such that nine separator rolls were prepared. Then, each separator roll was measured for misalignment. It should be noted that each groove was formed in a manner such that the acute angle between a line segment connecting the start and end points of the groove and a straight line parallel to TD of the core is 15 degrees or less.

As illustrated in FIG. 9, the depth of each groove was measured at the following three points: a middle point (measuring point M2); and a point 1 cm apart from each end (measuring points M1 and M3), and the mean of the measured depths was used as the depth of the groove.

The depth DP of the groove was measured using a confocal laser scanning microscope LEXT OLS4100 available from Olympus. The measurement conditions are as follows.
  Objective lens: 20×
  Laser wavelength: 405 nm
  Measurement mode: Confocal (reflection)
  Image field of view: 644 μm×646 μm (1024×1024 pixels)
  Horizontal correction: None As illustrated in FIG. 10, the maximum misalignment PR between an edge of a first wound layer portion 12a of the separator 12 wound on the core and an edge of a portion of the separator 12 excluding the first wound layer portion 12a (such a portion is hereinafter referred to as a portion 12b) obtained by winding the separator 12 until a thickness of 10 mm or greater is reached was used as misalignment.

FIG. 11 shows the measurement results on the separator rolls 10 in accordance with the first to ninth experimental examples EX 1 to EX9. It should be noted that the "PERIPHERAL LENGTH OF CORE" in FIG. 11 means the outer circumference D (mm) (refer to FIG. 7) of the core. The separator roll of the fifth experimental example EX5 is a conventional product in which the core has no grooves.

Further note that the "FIRST GROOVE", "SECOND GROOVE", and "THIRD GROOVE" in FIG. 11 mean the grooves in the cores in accordance with the experimental examples. The symbol "–" means that no grooves are provided. For example, the "THIRD GROOVE" column of the core of the second experimental example EX2 has the symbol "–", which means that the core has the following two grooves: "FIRST GROOVE" and "SECOND GROOVE."

In FIG. 12, the horizontal axis shows the value of (number of grooves/peripheral length of core) (unit: grooves/mm) whereas the vertical axis shows misalignment (unit: mm).

FIGS. 11 and 12 demonstrate that the separator roll of the fifth experimental example EX5 has a misalignment of 1.7 mm, which is large as compared to the separator rolls of the other experimental examples.

It was demonstrated that the separator roll of the ninth experimental example EX9 also has a misalignment that is as large as 1.8. It is apparent that this is because the depth of a groove in the core of the separator roll of the ninth experimental example EX9 is 26 μm, which is too shallow as compared to the depths of grooves in the cores of the separator rolls of the other experimental examples.

As described above, the first to fourth experimental examples EX1 to EX4 and the sixth to eighth experimental examples EX6 to EX8 demonstrated that, when the depth of the groove 9 is 30 μm or greater, each misalignment is 1.5 μm or less and that the misalignment is reduced.

As described above, it was found that, when the outer peripheral surface of a core has a groove of 30 μm or greater in depth and the value of (number of grooves/peripheral length of core) is greater than 0.0025 (grooves/mm), it is possible to produce a separator roll in which the difference between an edge of the first wound layer portion 12a of the separator 12 wound around the core and an edge of the portion 12b obtained by winding the separator 12 until a thickness of 10 mm is reached is 1.5 mm or less.

Furthermore, as compared to the sixth experimental example EX6, the fourth and seventh experimental examples EX4 and EX7, which have more grooves per peripheral length of core, are misaligned to a lesser extent. As compared to the fourth and seventh experimental examples EX4 and EX7, the second and third experimental examples EX2 and EX3, which have more grooves per peripheral length of core, are misaligned to a lesser extent. As compared to the second and third experimental examples EX2 and EX3, the first and eighth experimental examples EX1 and EX8, which have more grooves per peripheral length of core, are misaligned to a lesser extent.

As described above, it was found that there is a tendency that, despite errors to some degree, as the number of grooves per peripheral length of core increases, the effect of reducing misalignment is enhanced.

In particular, when the depth of a groove is 30 μm or greater, preferably 50 μm or greater, and the value of (number of grooves/peripheral length of core) is greater than 0.0025 (grooves/mm) like the first to fourth experimental examples EX1 to EX4, the seventh experimental example EX7, and the eighth experimental example EX8, the effect of reducing misalignment is enhanced.

Moreover, when the depth of a groove is 118 μm or greater and the value of (number of grooves/peripheral length of core) is 0.0031 (grooves/mm) or greater like the first to fourth experimental examples EX1 to EX4, the seventh experimental example EX7, and the eighth experimental example EX8, the effect of reducing misalignment is greatly enhanced.

As described above, these experiments demonstrated that grooves in the outer peripheral surface of the core alone may not be enough to prevent or reduce the misalignment of wound layers. Specifically, the experiments demonstrated that, for the effect of reducing misalignment of wound layers to be attained, the groove(s) should be made in the outer peripheral surface of the core in a manner such that the depth is 30 μm or greater and that the value of (number of grooves/peripheral length of core) is greater than 0.0025 (grooves/mm).

[Recap]

As has been described, a core according to one aspect of the present invention is a core for allowing a battery separator to be wound around an outer peripheral surface thereof, including one or more grooves in the outer peripheral surface, the one or more grooves extending in a direction intersecting a direction in which the battery separator is wound, the one or more grooves having a depth of 30 μm or greater, and the following condition (1) being satisfied:

$$N/D > 0.0025 \quad (1)$$

where D is the outer circumference in mm of the core and N is the number of the one or more grooves in the outer peripheral surface.

With the above configuration, it is possible to allow the air trapped between the first wound layer of the battery separator and the core to escape sufficiently along the grooves when the battery separator is wound around the core. This makes it possible to prevent or reduce the misalignment of wound layers of the battery separator.

The core of one aspect of the present invention is preferably arranged such that the one or more grooves have a depth of 1000 μm or less. This makes it easy to remove foreign substances, if any, in the grooves and thus possible to readily recycle the core.

The core of one aspect of the present invention is preferably arranged such that the one or more grooves have a depth of 50 μm or greater. This makes it possible to allow the air trapped between the battery separator and the core to escape more efficiently along the groove.

The core of one aspect of the present invention is preferably arranged such that N/D<0.1. This makes it possible to maintain the strength of the core and prevent the breakage of the core when the battery separator is wound.

The core of one aspect of the present invention is preferably arranged such that the one or more grooves have at least one end thereof at an edge of the core. This makes it possible to allow the air trapped between the battery separator and the core to escape more efficiently along the grooves.

The core of one aspect of the present invention is preferably arranged such that, assuming that the dimension of the outer peripheral surface in a direction perpendicular to the direction in which the battery separator is wound is the width of the outer peripheral surface, the one or more groove are longer than half the width of the outer peripheral surface. The core is preferably arranged such that the one or more grooves are at an angle of 15 degrees or less to a straight line perpendicular to the direction in which the battery separator is wound. This makes it possible to allow the air trapped between the outer peripheral surface of the core and the battery separator to escape more efficiently.

A separator roll of another aspect of the present invention preferably includes the above-described core and a battery separator wound around the core. With this configuration, it is possible to obtain a separator roll which is not misaligned or misaligned to a lesser extent.

The separator roll of another aspect of the present invention is preferably arranged such that the difference between an edge of a first wound layer portion of the battery separator and an edge of a portion of the battery separator obtained by winding the battery separator on the core until a thickness of 10 mm is reached is 1.5 mm or less. With this arrangement, it is possible to obtain a separator roll which does not necessitate unwinding and rewinding.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1 Lithium-ion secondary battery
2 External device
3 Lithium ion
4 Heat-resistant layer
5 Porous film
6 Slitting apparatus
7 Cutting device
8, c, u, l Core
10 Separator roll
11 Cathode
12 Separator (battery separator)
12a First wound layer portion
12b Portion excluding first wound layer portion
13 Anode
61 Wind-off roller
62, 63, 68 Roller
70l, 70u, 70l Take-up roller
71 Holder
81 Outer cylindrical part
82 Inner cylindrical part
83 Rib

The invention claimed is:

1. A core for allowing a battery separator to be wound around an outer peripheral surface thereof, comprising two or more grooves in the outer peripheral surface, the two or more grooves extending in a direction intersecting a direction in which the battery separator is wound,
the two or more grooves having a depth of 30 μm or greater, and
the following condition (1) being satisfied:

$$N/D > 0.0025 \quad (1)$$

where D is an outer circumference in mm of the core and N is the number of the two or more grooves in the outer peripheral surface.

2. The core according to claim 1, wherein the two or more grooves have a depth of 1000 μm or less.

3. The core according to claim 1, wherein the two or more grooves have a depth of 50 μm or greater.

4. The core according to claim 1, wherein N/D<0.1.

5. The core according to claim 1, wherein the two or more grooves have at least one end thereof at an edge of the core.

6. The core according to claim 1, wherein the outer peripheral surface has a width, wherein the width is a dimension of the outer peripheral surface in a direction perpendicular to the direction in which the battery separator is wound, and wherein the two or more grooves are longer than half the width of the outer peripheral surface.

7. The core according to claim 1, wherein the two or more grooves are at an angle of 15 degrees or less to a straight line perpendicular to the direction in which the battery separator is wound.

8. A separator roll comprising:
the core as set forth in claim 1; and
a battery separator wound around the core.

9. The separator roll according to claim 8, wherein when a distance between an outer peripheral surface of the core and an outer peripheral surface of the wound separator roll having T turns is equal to or less than 10 mm, a distance between the outer peripheral surface of the core and an outer peripheral surface of the wound separator roll having T+1 turns is greater than 10 mm, wherein a misalignment between an edge of a first layer of the separator roll wound around the core and a corresponding edge of a P-th layer of the separator roll wound around the core is 1.5 mm or less, wherein P is an integer of 2 or more and T or less.

10. The core according to claim 1, wherein the two or more grooves have both of opposite ends thereof positioned at opposite edges of the core.

11. The core according to claim 1, wherein at least two of the two or more grooves intersect each other.

\* \* \* \* \*